(12) United States Patent
Jansma

(10) Patent No.: US 10,328,515 B2
(45) Date of Patent: Jun. 25, 2019

(54) NECK FOR A WELDING GUN

(75) Inventor: Jeremy L. Jansma, Lowell, IN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1013 days.

(21) Appl. No.: 13/427,976

(22) Filed: Mar. 23, 2012

(65) Prior Publication Data

US 2012/0248085 A1 Oct. 4, 2012

Related U.S. Application Data

(60) Provisional application No. 61/468,875, filed on Mar. 29, 2011.

(51) Int. Cl.
   *B23K 9/32* (2006.01)
   *B23K 9/29* (2006.01)
(52) U.S. Cl.
   CPC .............. *B23K 9/291* (2013.01); *B23K 9/295* (2013.01); *B23K 9/323* (2013.01)
(58) Field of Classification Search
   CPC .......... B23K 9/291; B23K 9/295; B23K 9/323
   USPC ........................................ 219/137.63, 137.31
   See application file for complete search history.

(56) References Cited

U.S. PATENT DOCUMENTS 2,278,997 A * 4/1942 Knight ...................... F16D 1/04
                                                      403/300
2,370,171 A * 2/1945 Jepson ..................... F16B 39/04
                                                      411/516
3,681,565 A * 8/1972 Fisher ................... B23K 9/0209
                                                      182/142
3,783,233 A * 1/1974 dal Molin .............. B23K 9/291
                                                      219/136
4,385,790 A * 5/1983 Genoa ................... A47L 9/2868
                                                      439/191

(Continued)

FOREIGN PATENT DOCUMENTS

JP        58074285         5/1983

OTHER PUBLICATIONS

International Search Report; PCT/US2012/030227; dated Jul. 10, 2012.

(Continued)

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

A welding gun includes a gun assembly including a handle having a cable receiving end and also a connecting end. The connecting end includes a tubular end fitting having female threads proximal to the connecting end, and also having an aperture adjacent the female threads. A neck assembly includes a body tube having a welding end and also a connecting end. The connecting end of the body tube is telescopically engageable with the tubular end fitting. The connecting end of the body tube includes an annular recess inwardly spaced from a terminus of the connecting end, and also includes a locking nut and male threads engageable with the female threads. The locking nut and male threads are disposed adjacent the annular recess away from the terminus. A stop is fitable in the aperture and extends into the annular recess in an assembled disposition of the gun.

5 Claims, 12 Drawing Sheets

(56) References Cited

U.S. PATENT DOCUMENTS

| | | | | |
|---|---|---|---|---|
| 4,892,432 A | * | 1/1990 | Cooper | F16B 3/00 |
| | | | | 192/53.35 |
| 5,279,138 A | * | 1/1994 | Gallagher | E05B 9/084 |
| | | | | 70/341 |
| 5,384,447 A | | 1/1995 | Raloff et al. | |
| 5,866,874 A | * | 2/1999 | Haczynski | B23K 9/296 |
| | | | | 219/137.31 |
| 6,055,703 A | * | 5/2000 | Redding | A47L 5/28 |
| | | | | 15/351 |
| 7,294,809 B2 | * | 11/2007 | Giese | 219/137.31 |
| 7,356,876 B2 | * | 4/2008 | Dant | A47L 9/02 |
| | | | | 15/414 |
| 2006/0226134 A1 | * | 10/2006 | Giese et al. | 219/137.31 |
| 2010/0096374 A1 | | 4/2010 | Karpoff et al. | |

OTHER PUBLICATIONS

Written Opinion of the International Searching Authority; PCT/US2012/030227; dated Jul. 10, 2012.

* cited by examiner

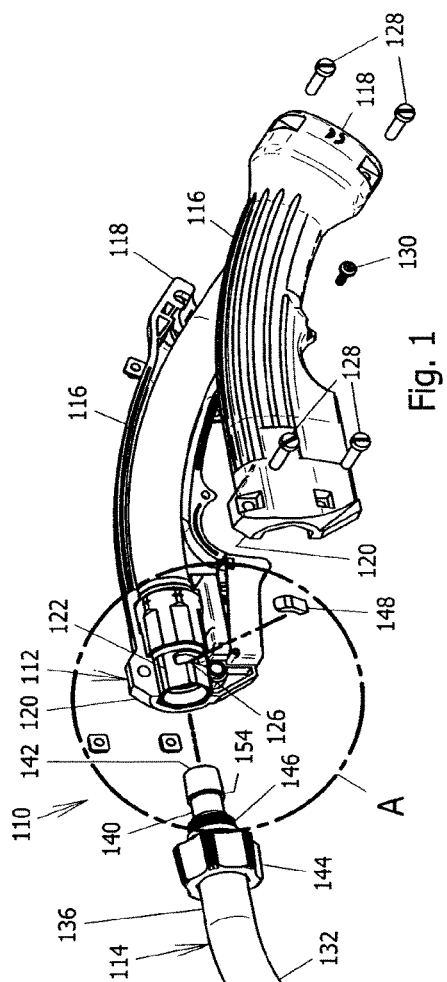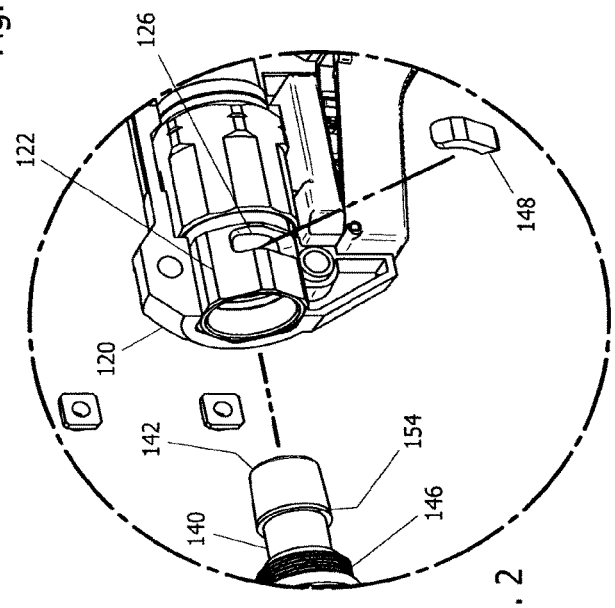

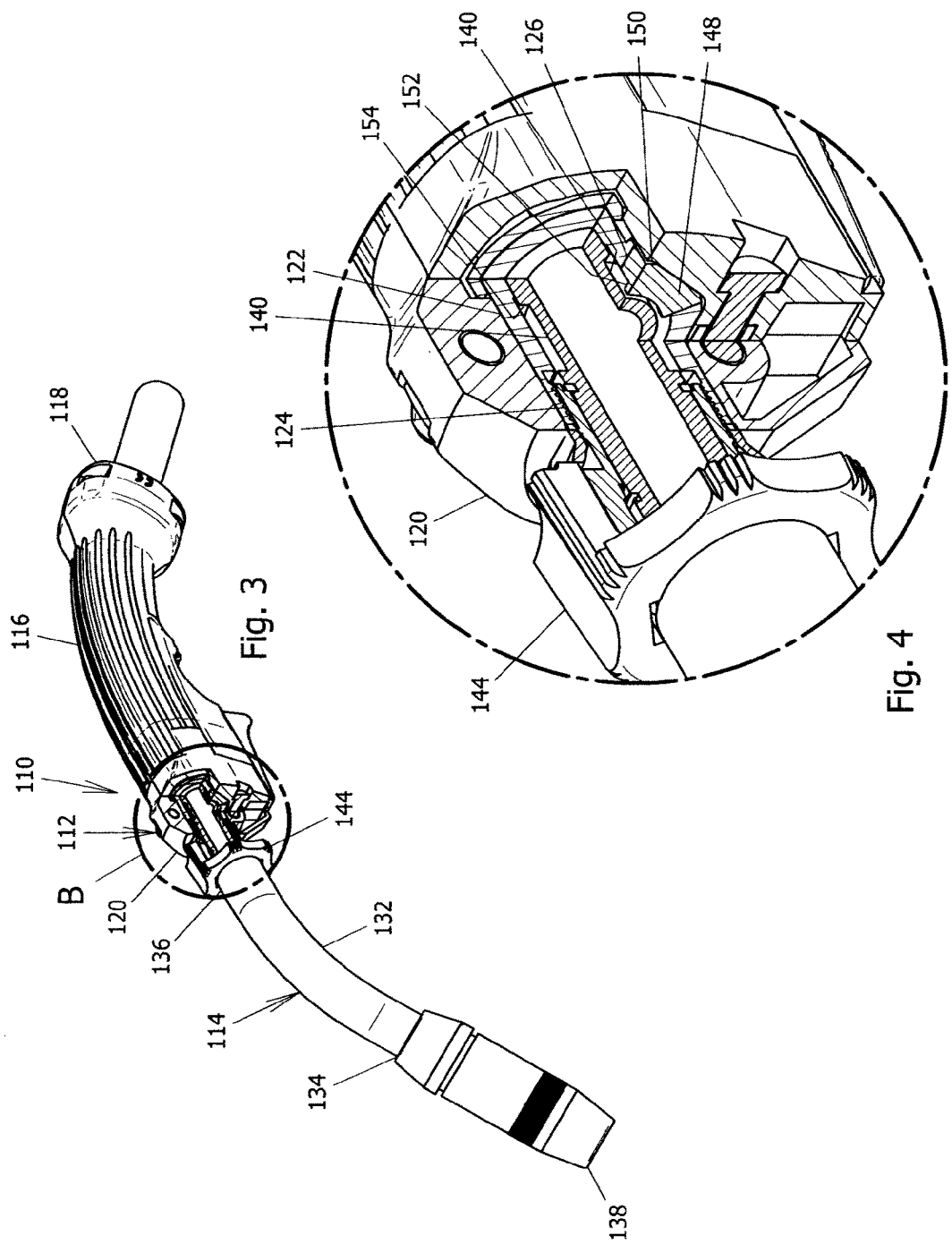

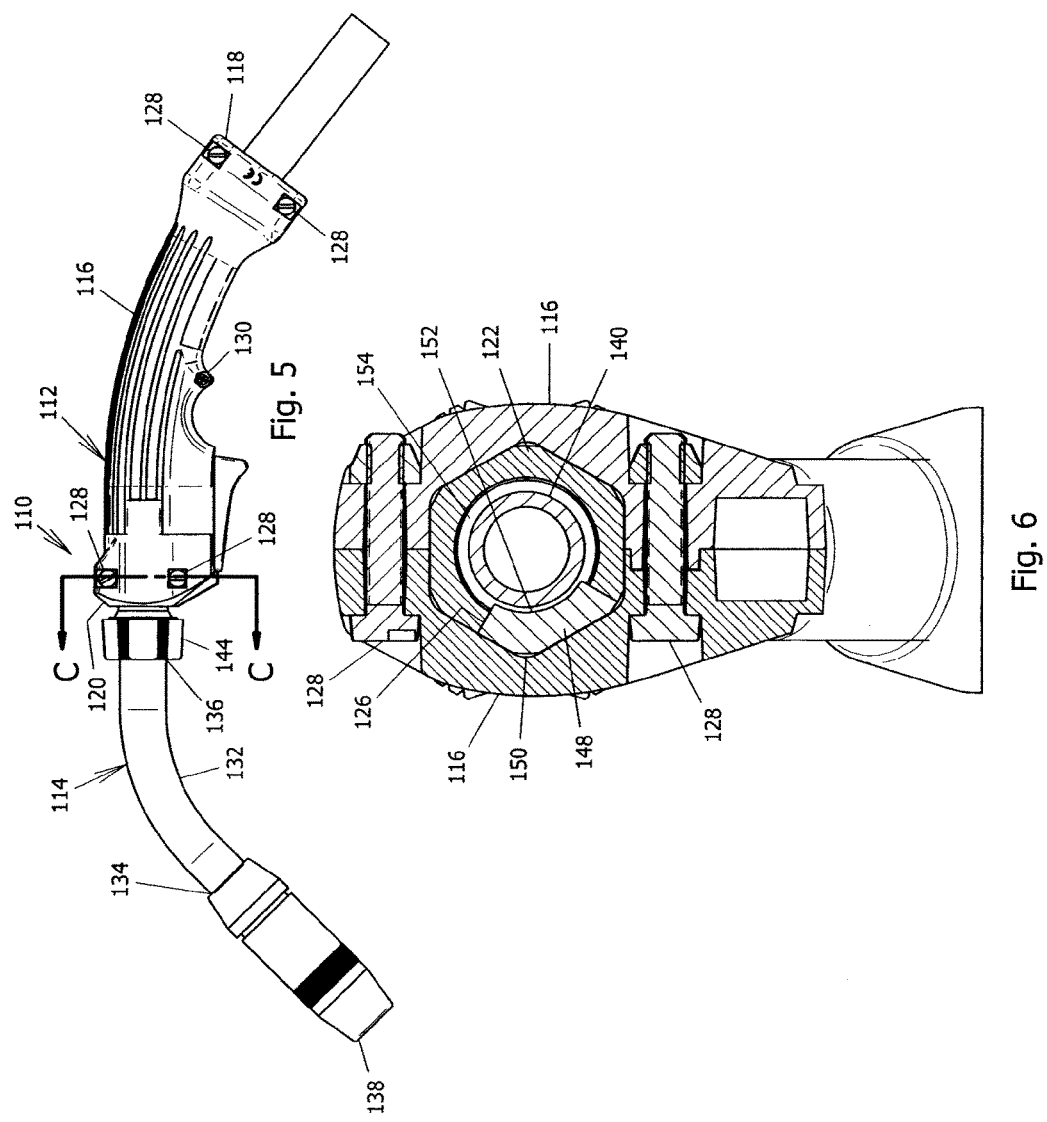

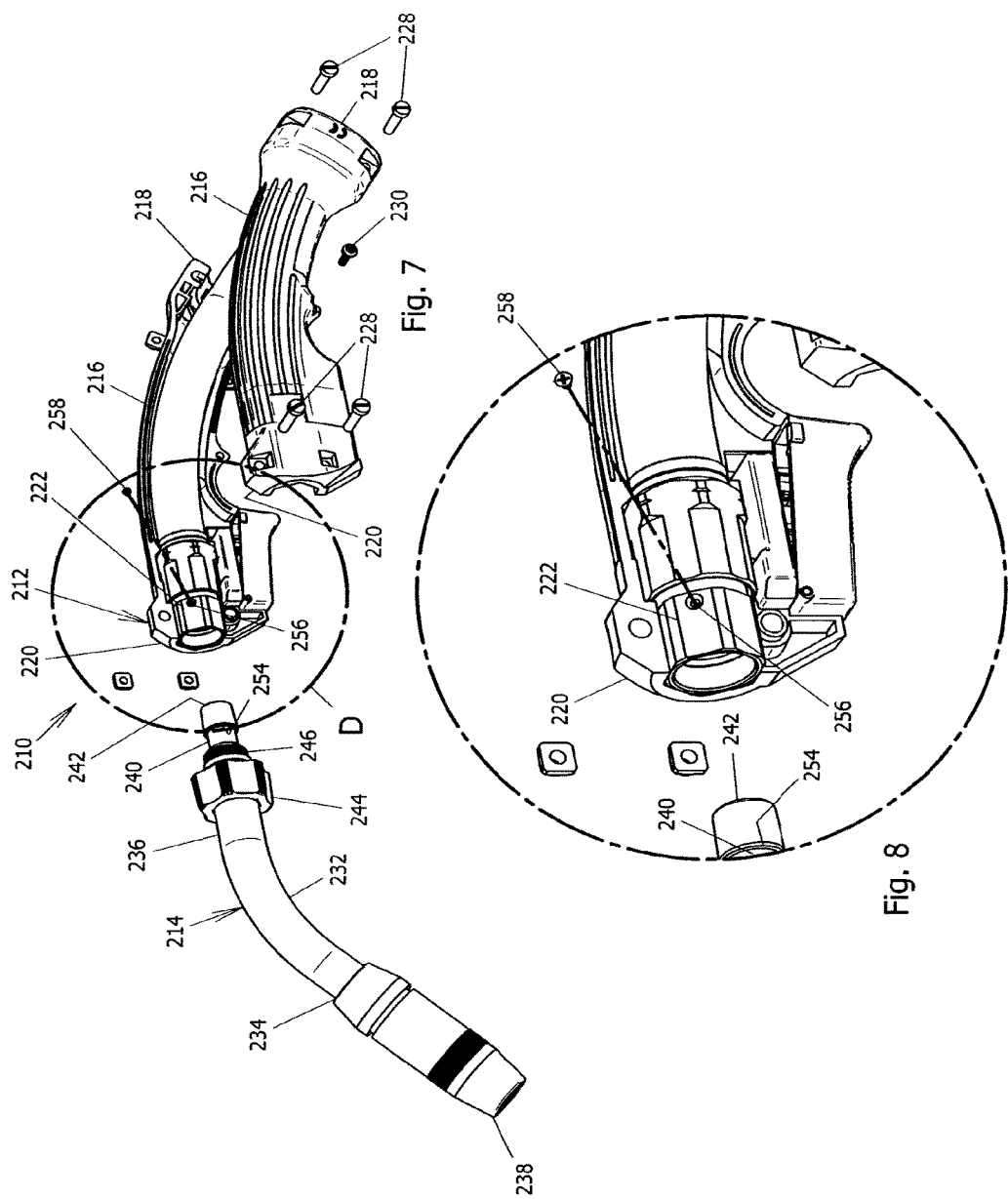

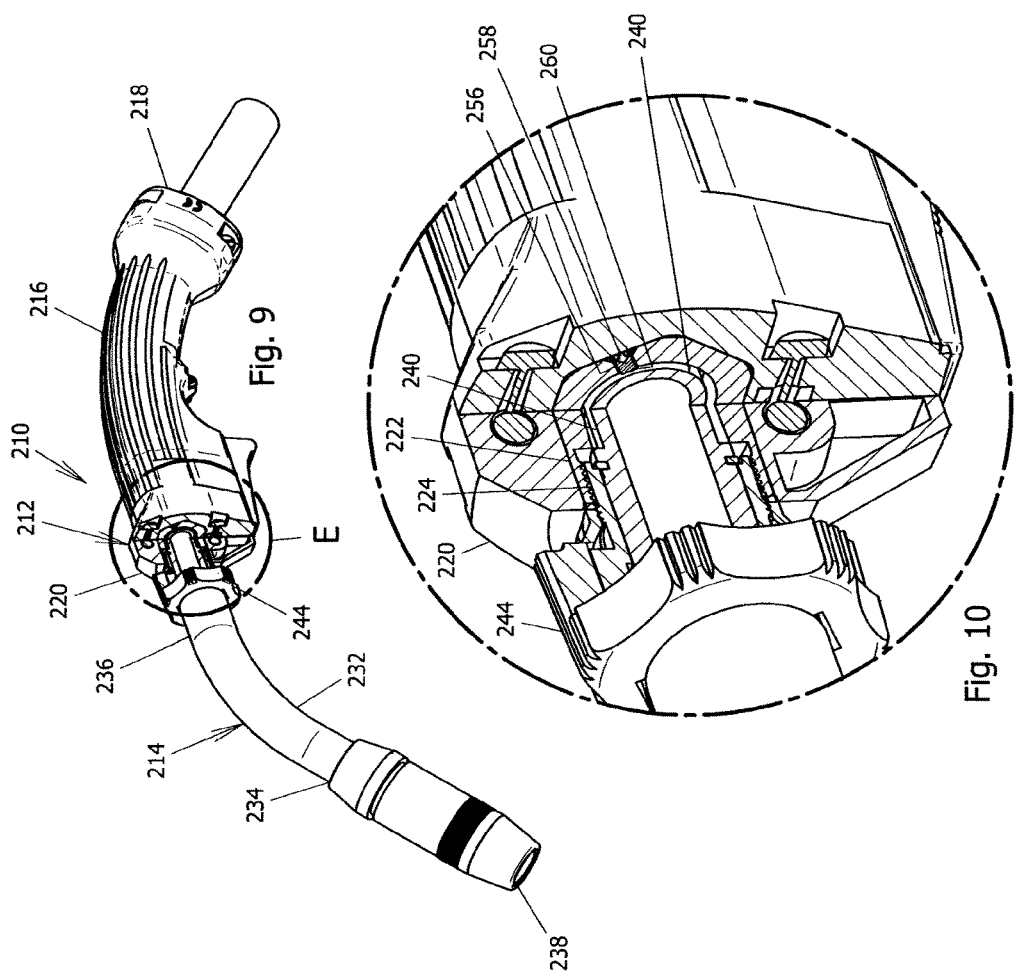

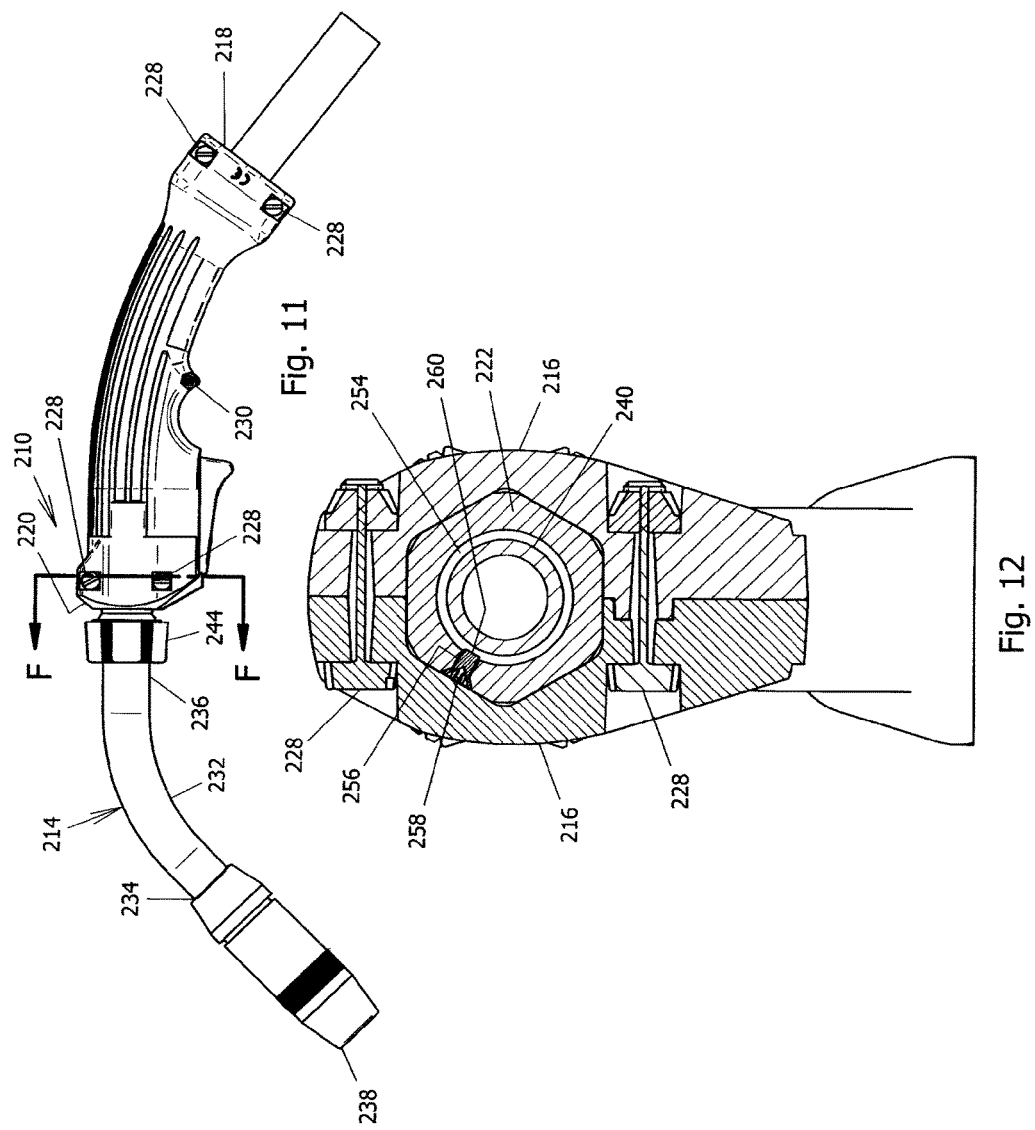

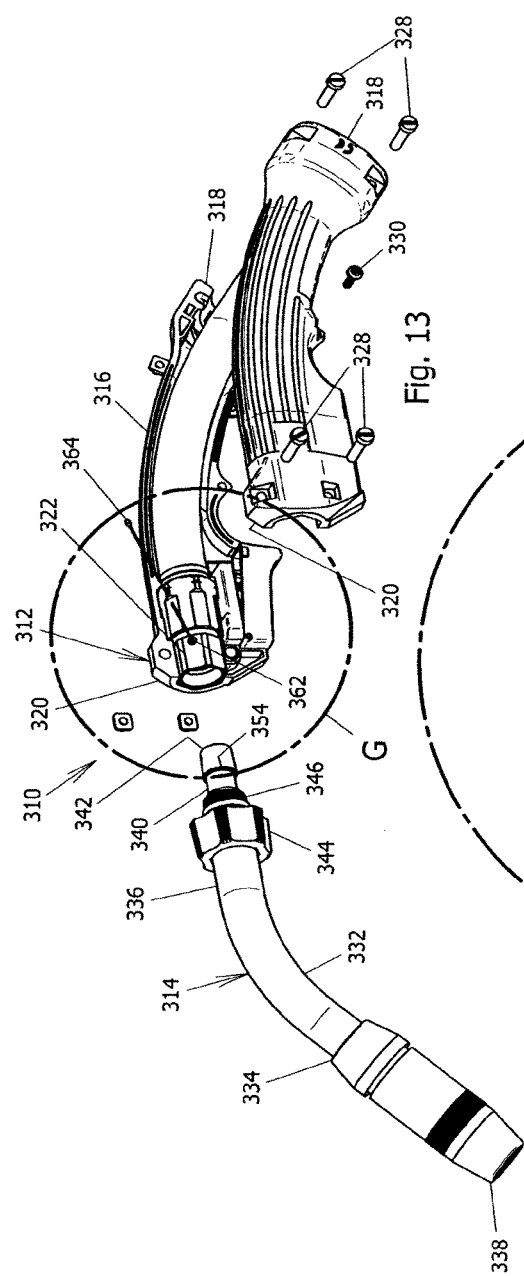
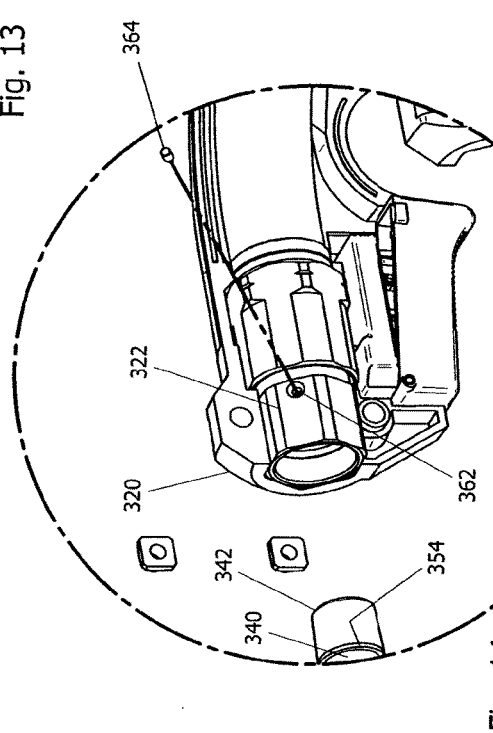
Fig. 13
Fig. 14

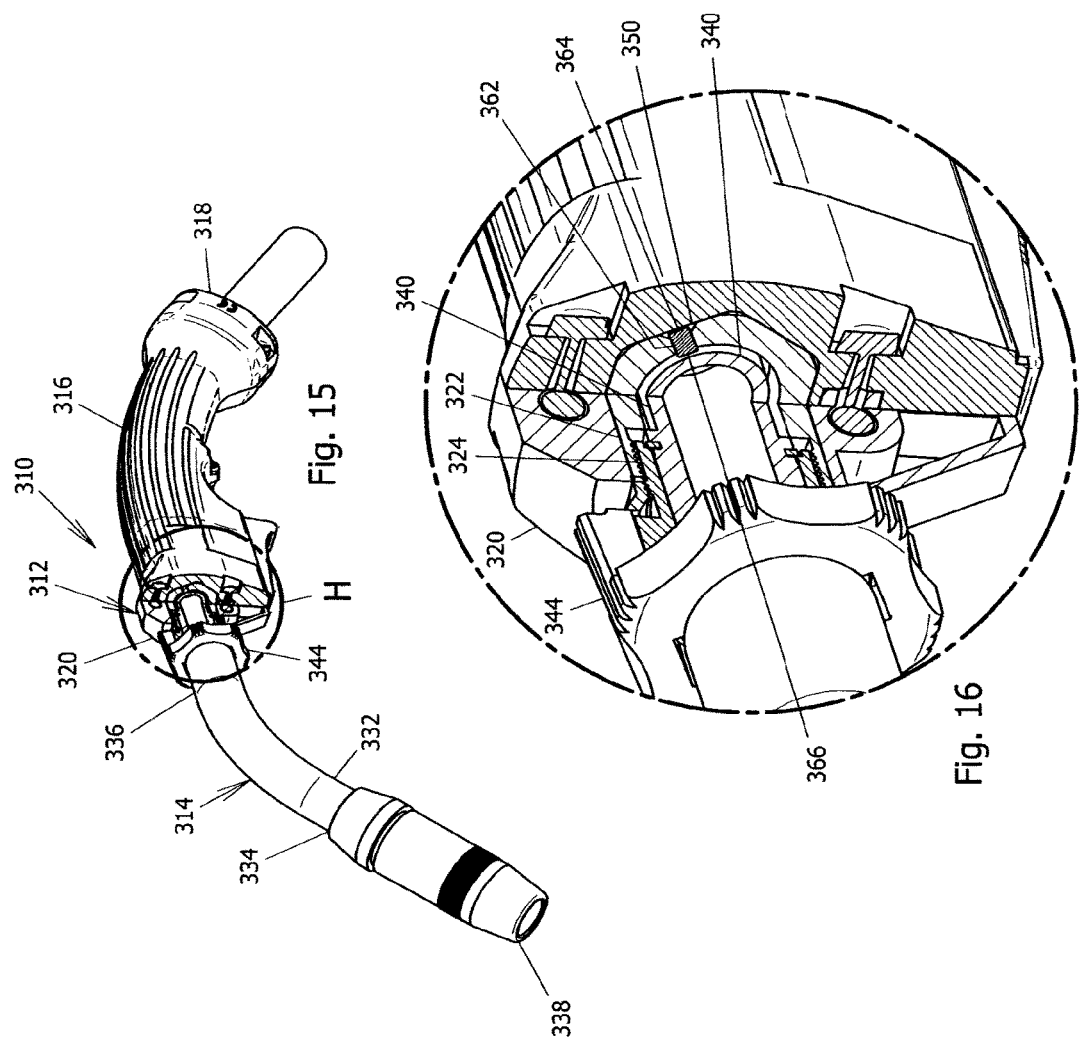

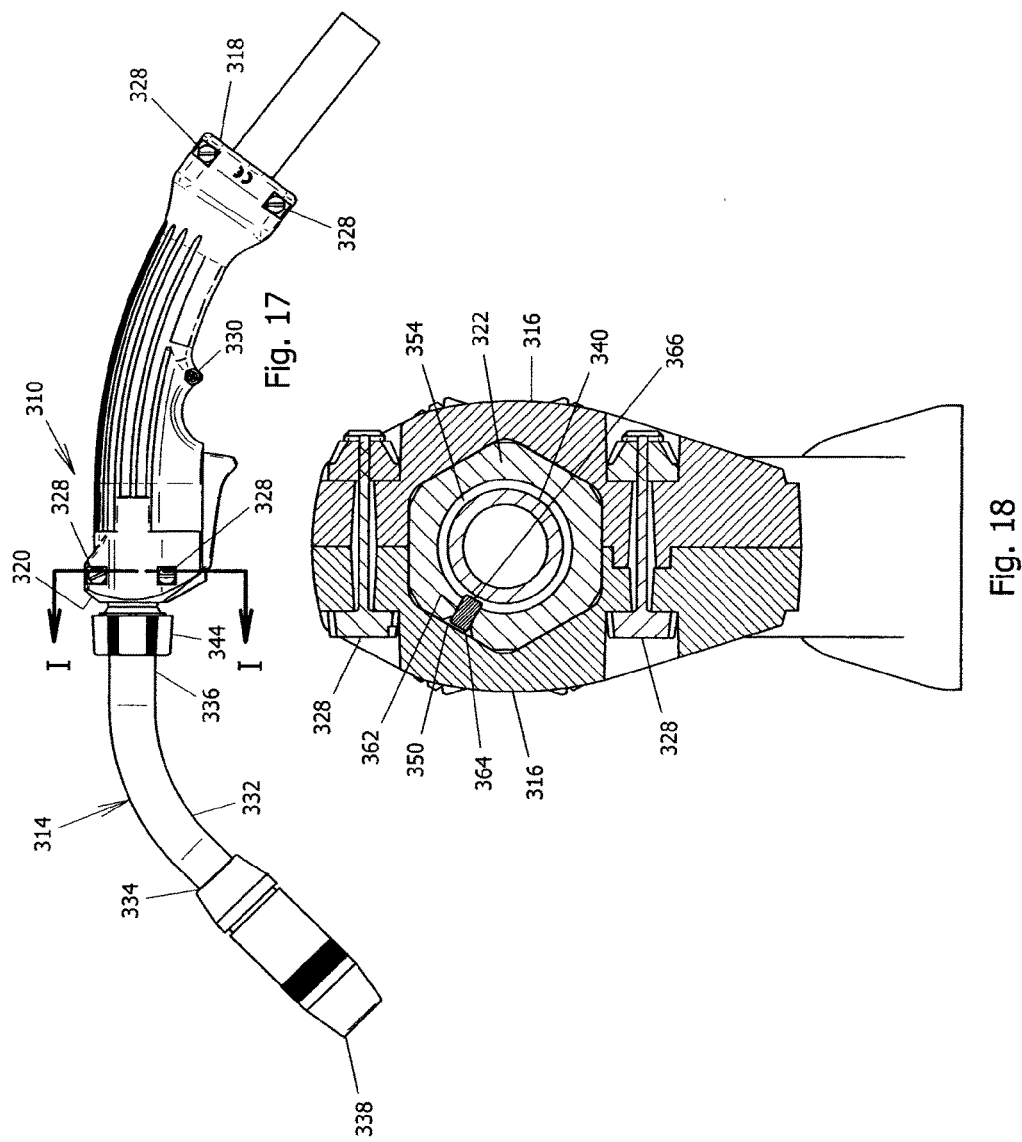

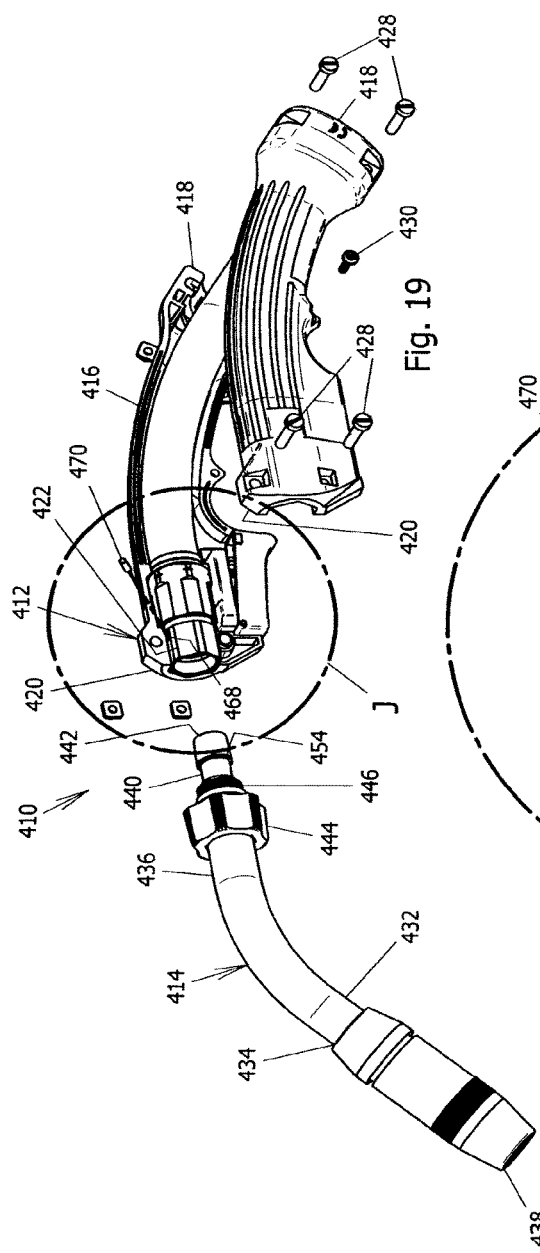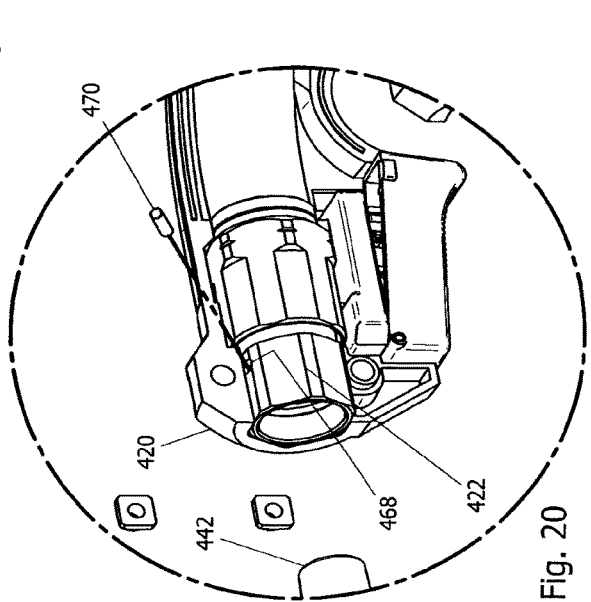

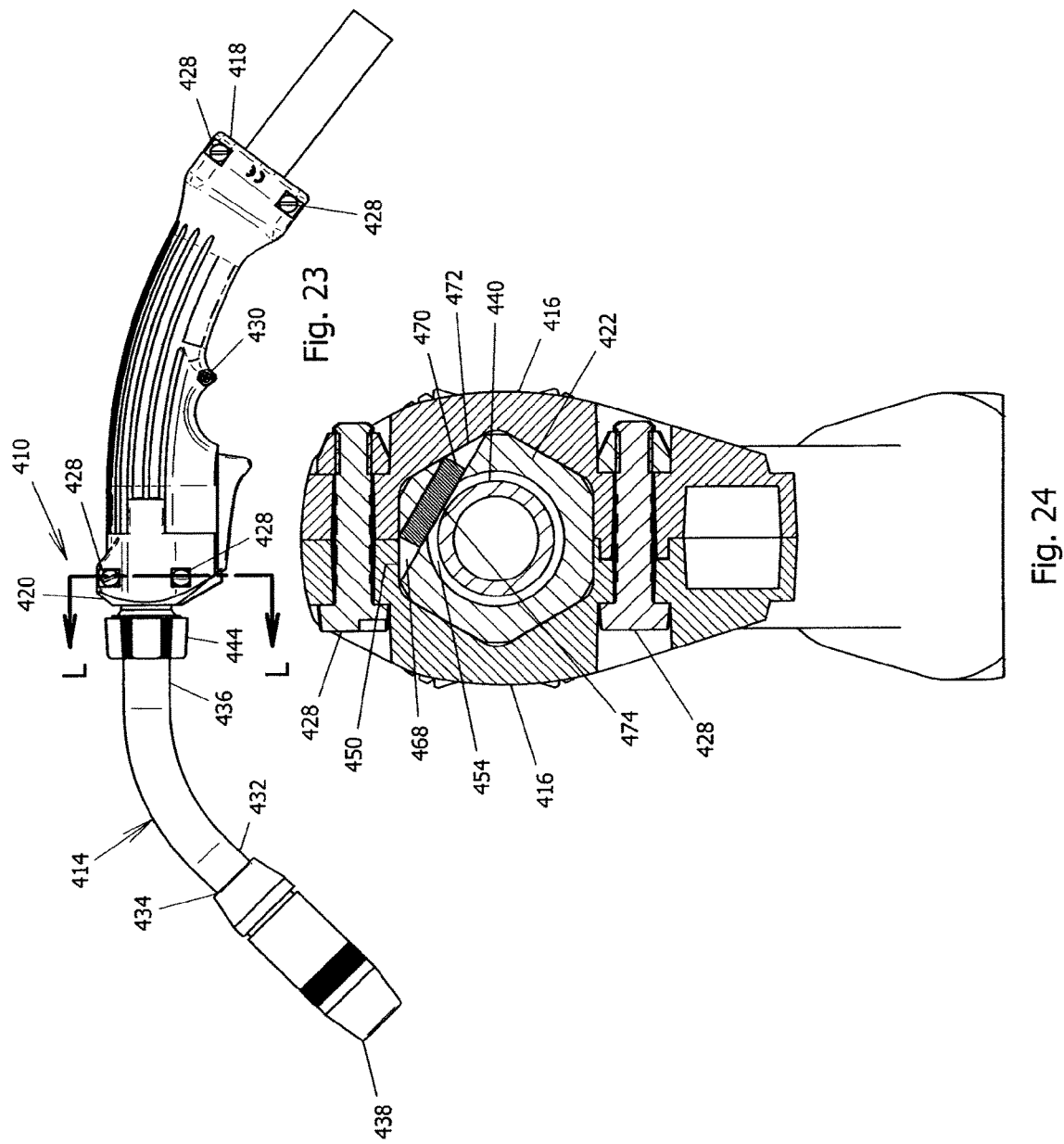

NECK FOR A WELDING GUN

CROSS REFERENCE TO RELATED APPLICATION

This application claims the priority of U.S. Provisional Application No. 61/468,875 filed Mar. 29, 2011.

TECHNICAL FIELD

This invention relates to welding guns, and more particularly to a neck for a welding gun.

BACKGROUND OF THE INVENTION

Welding is used in various manufacturing and construction applications to join various metal pieces together to form a unitary piece. An arc welding system typically includes an electric power supply coupled to a welding gun that houses an electrode that is located in the handle. The electrode completes an electrical circuit with a source of power when the electrode is placed against a piece of metal to be welded. The contact between the electrode and the piece of metal produces an electric arc between the electrode and the metal piece. The heat of the electric arc is concentrated on the metal piece, or pieces, to be joined, thereby melting the metal piece(s). A filler material is added to the molten metal, which subsequently cools and solidifies, joining the metal pieces together.

Metal Inert Gas (MIG) welding is one type of arc welding. MIG welding is also referred to as "wire feed" or Gas Metal Arc Welding (GMAW). In MIG welding a metal wire is used as the electrode to produce the arc. The wire is shielded by an inert gas and the metal wire acts as the filler for the weld. The inert gas is used to shield the electric arc from contaminants and gases that may react with the weld. Typically, the wire and gas are fed through a hand-held welding gun. The wire and gas are fed to the welding gun from a welding system having a wire feeder, a power source and a source of gas.

A robotic MIG welding gun assembly typically includes a main body mountable on a robotic arm, a gooseneck, and a contact tip assembly. Alternatively, the MIG welding gun may include a handle for gripping by a human operator. A flexible cable is connected to a rearward end of the main body to supply gas, electrical current, and a consumable electrode (e.g., a metal welding wire) to the gun. The cable may be connected to a wire feeder opposite the main body. The gooseneck is operatively connected to a forward end of the main body and allows for the communication of the consumable electrode, the shielding gas, and the welding current to the contact tip assembly mounted on the gooseneck.

The MIG welding gun may include a locking nut that can be loosened to adjust the position of the contact tip assembly relative to the handle of the gun by rotating the gooseneck relative to the handle. However, loosening of the locking nut also allows the gooseneck to be freely removed from the welding gun, with or without authorization.

SUMMARY OF THE INVENTION

The present invention provides a neck for a welding gun that is both rotatable about and lockable to a welding gun assembly. The neck is rotatable in a radial direction to position a welding tip disposed at a distal end of the neck, but is prevented from moving in an axial direction, so that the neck cannot be removed from the welding gun without proper authorization yet can be rotated and positioned freely to meet the welder's requirements.

More particularly, a welding gun in accordance with the invention includes a gun assembly including a handle having a cable receiving end and also a connecting end. The connecting end includes a tubular end fitting having female threads proximal to the connecting end. The end fitting also has an aperture adjacent the female threads. A neck assembly includes a body tube having a welding end and also a connecting end. The connecting end of the body tube is telescopically engageable with the tubular end fitting. The connecting end of the body tube includes an annular recess inwardly spaced from a terminus of the connecting end. The connecting end of the body tube also includes a locking nut and male threads engageable with the female threads. The locking nut and male threads are disposed adjacent the annular recess away from the terminus. A stop is fitable in the aperture and extends into the annular recess in an assembled disposition of the gun, thereby restricting axial movement of the neck assembly relative to the gun assembly yet allowing rotational movement of the neck assembly relative to the gun assembly.

The annular recess may be a small diameter portion of the connecting end of the neck assembly. The annular recess may be smaller in diameter than the male threads and the terminus of the connecting end of the neck assembly.

The aperture generally may have a quadrilateral shape. Alternatively, the aperture may be generally circular in shape.

The stop may be a key. The key may be retained by an inner surface of the handle adjacent the female threads of the tubular end fitting. The key may include a protrusion along an inner edge that is positioned in the annular recess in the assembled disposition of the gun. The annular recess may include a sidewall opposite the locking nut and male threads, and the protrusion of the key may be contactable with the sidewall of the annular recess, thereby limiting axial movement of the neck assembly.

Alternatively, the stop may be a screw threadable in the aperture. A portion of a body of the screw is positioned in the annular recess in the assembled disposition of the gun. The annular recess may include a sidewall opposite the locking nut and male threads, and the portion of the screw body may be contactable with the sidewall of the annular recess, thereby limiting axial movement of the neck assembly.

Alternatively, the stop may be a pin. An end of the pin may be positioned in the annular recess in the assembled disposition of the gun. The annular recess may include a sidewall opposite the locking nut and male threads, and the pin end may be contactable with the sidewall of the annular recess, thereby limiting axial movement of the neck assembly. Alternatively, a side surface of the pin may be positioned in the annular recess in the assembled disposition of the gun. The annular recess may include a sidewall opposite the locking nut and male threads, and the pin side surface may be contactable with the sidewall of the annular recess, thereby limiting axial movement of the neck assembly.

A method of assembling a welding gun includes the steps of: providing a gun assembly including a handle having a cable receiving end and also a connecting end, the handle comprising two separable members, the connecting end including a tubular end fitting having female threads proximal to the connecting end, and the end fitting also having an aperture adjacent the female threads; separating the two handle members; providing a neck assembly including a body tube having a welding end and also a connecting end, the connecting end of the body tube including an annular recess inwardly spaced from a terminus of the connecting end, a locking nut, and male threads engageable with the female threads, the locking nut and male threads being disposed adjacent the annular recess away from the terminus; telescopically engaging the connecting end of the body tube with the tubular end fitting of the gun assembly; fitting a stop in the aperture, the stop extending into the annular recess; and connecting the two handle members to secure the stop in the annular recess, thereby restricting axial movement of the neck assembly relative to the gun assembly yet allowing rotational movement of the neck assembly relative to the gun assembly.

These and other features and advantages of the invention will be more fully understood from the following detailed description of the invention taken together with the accompanying drawings.

BRIEF DESCRIPTION OF THE DRAWINGS

In the drawings:

FIG. 1 is a perspective, partially exploded view of a welding gun in accordance with the present invention;

FIG. 2 is an enlarged view of a portion A in FIG. 1;

FIG. 3 is a perspective, partial sectional view of the welding gun of FIG. 1;

FIG. 4 is an enlarged view of a portion B in FIG. 3;

FIG. 5 is a side view of the welding gun of FIG. 1;

FIG. 6 is a cross-sectional view of the welding gun taken along the line C-C in FIG. 5;

FIG. 7 is a perspective, partially exploded view of an alternative welding gun in accordance with the present invention;

FIG. 8 is an enlarged view of a portion D in FIG. 7;

FIG. 9 is a perspective, partial sectional view of the welding gun of FIG. 7;

FIG. 10 is an enlarged view of a portion E in FIG. 9;

FIG. 11 is a side view of the welding gun of FIG. 7;

FIG. 12 is a cross-sectional view of the welding gun taken along the line F-F in FIG. 11;

FIG. 13 is a perspective, partially exploded view of another alternative welding gun in accordance with the present invention;

FIG. 14 is an enlarged view of a portion G in FIG. 13;

FIG. 15 is a perspective, partial sectional view of the welding gun of FIG. 13;

FIG. 16 is an enlarged view of a portion H in FIG. 15;

FIG. 17 is a side view of the welding gun of FIG. 13;

FIG. 18 is a cross-sectional view of the welding gun taken along the line I-I in FIG. 17;

FIG. 19 is a perspective, partially exploded view of yet another alternative welding gun in accordance with the present invention;

FIG. 20 is an enlarged view of a portion J in FIG. 19;

FIG. 23 is a side view of the welding gun of FIG. 19; and

FIG. 24 is a cross-sectional view of the welding gun taken along the line L-L in FIG. 23.

DETAILED DESCRIPTION OF THE INVENTION

Figure 21:
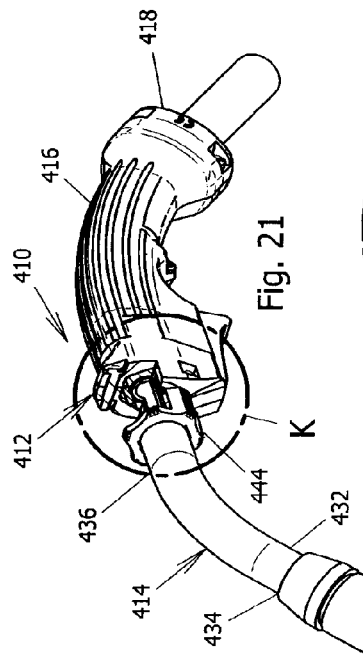
FIG. 21 is a perspective, partial sectional view of the welding gun of FIG. 19.

Referring now to the drawings in detail, numeral 110 generally indicates a welding gun, such as a gas metal arc welding (GMAW) gun or a similar welding gun, in accordance with the invention.

The welding gun 110 generally includes a gun body, a gooseneck extending from a forward end of the gun body, and a contact tip assembly at a distal end of the gooseneck. A cable may be connected to a rear end of the gun body. The cable supplies electrical current, shielding gas, and a consumable electrode (e.g., a metal welding wire) to the gun body. The electrical current, shielding gas, and consumable electrode travel through the gun body to the gooseneck and ultimately exit through an orifice in the contact tip assembly.

The welding wire, when energized for welding, carries a high electrical potential. When the welding wire makes contact with target metal workpieces, an electrical circuit is completed and current flows through the welding wire, across the metal workpieces and to ground. The current causes the welding wire and the parent metal of the workpieces in contact with the welding wire to melt, thereby joining the workpieces as the melt solidifies.

With reference to FIGS. 1-6, in one embodiment the welding gun 110 includes a gun assembly 112 and a neck assembly 114. The gun assembly 112 includes a handle 116 having a cable receiving end 118 for receiving a cable (not shown) such as a composite cable, unicable, or similar which supplies electrical current, shielding gas (such as helium or argon gas), and a consumable electrode (e.g., a metal welding wire) to the gun 110. The handle 116 also has an opposite connecting end 120 for receiving and connecting the neck assembly 114 to the gun assembly 112. The connecting end 120 includes a tubular end fitting 122 having female threads 124 proximal to the connecting end, and an aperture 126 adjacent the female threads 124. The aperture 126 generally has a quadrilateral shape.

As shown in FIG. 1, the handle 116 is formed of two separate halves that are secured together with fasteners 128, 130. One handle half may be released from the other handle half by loosening the fasteners 128, 130 to expose the inner components of the gun assembly 112, as described in more detail below. The handle 116 may be made of an electrically insulating material, such as a plastic, and may have a configuration adapted for facilitating manipulation of the welding gun 110 by a welder.

The neck assembly 114 includes a body tube 132 having a welding end 134 and also a connecting end 136. The body tube 132 may be of the type that includes an inner element made of a conductive metal such as copper, an outer element made of a metal such as brass, and an insulating element disposed between the inner and outer elements, and made of an appropriate material such as high temperature TEFLON, nylon, or the like. The insulating element prevents electrical current from flowing from the inner element to the outer element. The body tube 132 is bent at an angle for facilitating the welding process, and the angle may be, but is not limited to 22.5, 30, 45, or 60 degrees. Alternatively, the body tube 132 may be straight.

The welding end 134 of the body tube 132 terminates at a nozzle 138 covering a contact tip (not shown) which weldingly contacts the consumable electrode during a welding operation.

The connecting end 136 of the body tube 132 is telescopically engageable with the tubular end fitting 122 of the gun assembly 112. The connecting end 136 of the body tube 132 includes an annular recess 140 inwardly spaced from a terminus 142 of the connecting end. The connecting end 136 of the body tube 132 also includes a locking nut 144 and male threads 146 engageable with the female threads 124 of the tubular end fitting 122. The annular recess 140 may be a small diameter portion of the connecting end 136 of the neck assembly 114 disposed between the terminus 142 and the male threads 146, and having a smaller diameter (and hence smaller circumference) than the terminus and the male threads. The male threads 146 define a threaded portion of the locking nut 144 and are mateable with the complementary female threads 124 to releaseably join the tube body 132 to the tubular end fitting 122. The locking nut 144 and male threads 146 are disposed adjacent the annular recess 140 away from the terminus 142 on an opposite side of the annular recess relative to the terminus.

A stop such as a key 148 is fitable into the aperture 126 in tubular end fitting 122 of the gun assembly 112, and the key has a shape that generally coincides with the shape of the aperture. The key 148 extends into the annular recess 140 in an assembled disposition of the gun, i.e., when the two halves of the gun handle 116 are fastened together. As shown in FIGS. 3, 4 and 6, the key 148 is contacted and retained in the aperture 126 by an inner surface 150 of one of the handle 116 halves. The inner surface 150 is adjacent the female threads 124 of the tubular end fitting 122. The key 148 includes a protrusion 152 along an inner edge. The protrusion 152 is positioned in the annular recess 140 in the assembled disposition of the gun 110. The annular recess 140 includes a sidewall 154 opposite the locking nut 144 and male threads 146. The protrusion 152 of the key 148 is contactable with the sidewall 154 of the annular recess 140, thereby limiting axial movement of the neck assembly 114 as described in more detail below.

To install the neck assembly 114 on the gun assembly 112, the fasteners 128, 130 are unscrewed to allow the two halves of the handle 116 to be separated. The key 148 is removed from the aperture 126, and the connecting end 136 of the body tube 132 is inserted into the tubular end fitting 122 of the gun assembly 112, as shown in FIGS. 1 and 2. The male threads 146 need to engage the female threads 124 in order for the aperture 126 to be lined up with the annular recess 140. The locking nut 144 is rotated clockwise to achieve this engagement. The key 148 is then reinserted into the aperture 126, the handle 116 halves are reconnected, and the fasteners 128, 130 are tightened to secure the handle together. In this assembled disposition, the protrusion 152 of the key 148 retains the neck assembly 114 in the gun assembly 112 by contacting the sidewall 154 of the annular recess 140 when the neck assembly is moved axially relative to the gun assembly, thereby limiting the outward axial movement of the neck assembly. This internal locking mechanism prevents the neck assembly 114 from being removed from the gun assembly 112 without disassembling the welding gun handle 116. Thus, the possibility of the neck assembly 114 being removed without proper authorization is greatly reduced.

While the key 148 and annular recess 140 limit the axially movement of the neck assembly 114, the key and annular recess allow for full 360 degree rotational movement of the neck assembly relative to the gun assembly 112, as shown in FIGS. 3, 4 and 6. Once the neck assembly 114 is fitted on the gun assembly 112 as described above, the neck assembly may be rotated radially 360 degrees about the tubular end fitting 122 of the gun assembly to position the welding end 134 of the body tube 132 in a desired orientation relative to the handle 116, depending on the requirements of the welding operation to be performed. When the welding end 134 is positioned in the desired orientation, the locking nut 144 is tightened, thereby engaging the male threads 146 with the female threads 124 and securing the neck assembly 114 in place. If the position of the neck assembly 114 later needs to be adjusted, the locking nut 144 is simply loosened, the neck assembly 114 is rotated relative to the gun assembly 112, and the locking nut is retightened.

If it is necessary to replace the neck assembly 114 with a different neck assembly (such as one having a body tube with a different angular bend), the handle 116 of the gun assembly 112 must be disassembled (with proper authorization) by unscrewing the fasteners 128, 130 to release the key 148 from the annular recess 140 and aperture 126. The male threads 146 need to be disengaged from the female threads 124 by rotating the locking nut 144 counterclockwise. The body tube 132 is pulled away from and out of the tubular end fitting 122 of the gun assembly 112, and a body tube of the replacement neck assembly is then inserted into the tubular end fitting. The male threads 146 need to engage the female threads 124 in order for the aperture 126 to be lined up with the annular recess 140. The locking nut 144 is rotated clockwise to achieve this engagement. The key 148 is reinserted into the aperture 126, and the handle 116 is reassembled to lock the neck assembly in the gun assembly.

With reference to FIGS. 7-12, an alternative welding gun 210 in accordance with the invention and similar to the welding gun 110 described above includes a gun assembly 212 and a neck assembly 214. The gun assembly 212 includes a handle 216 having a cable receiving end 218 for receiving a cable (not shown) such as a composite cable, unicable, or similar which supplies electrical current, shielding gas (such as helium or argon gas), and a consumable electrode (e.g., a metal welding wire) to the gun 210. The handle 216 also has an opposite connecting end 220 for receiving and connecting the neck assembly 214 to the gun assembly 212. The connecting end 220 includes a tubular end fitting 222 having female threads 224 proximal to the connecting end, and an aperture 256 adjacent the female threads 224. The aperture 256 generally is circular in shape.

As shown in FIG. 7, the handle 216 is formed of two separate halves that are secured together with fasteners 228, 230. One handle half may be released from the other handle half by loosening the fasteners 228, 230 to expose the inner components of the gun assembly 212, as described in more detail below. The handle 216 may be made of an electrically insulating material, such as a plastic, and may have a configuration adapted for facilitating manipulation of the welding gun 210 by a welder.

The neck assembly 214 includes a body tube 232 having a welding end 234 and also a connecting end 236. The body tube 232 may be of the type that includes an inner element made of a conductive metal such as copper, an outer element made of a metal such as brass, and an insulating element disposed between the inner and outer elements, and made of an appropriate material such as high temperature TEFLON, nylon, or the like. The insulating element prevents electrical current from flowing from the inner element to the outer element. The body tube 232 is bent at an angle for facilitating the welding process, and the angle may be, but is not limited to 22.5, 30, 45, or 60 degrees. Alternatively, the body tube 232 may be straight.

The welding end 234 of the body tube 232 terminates at a nozzle 238 covering a contact tip (not shown) which weldingly contacts the consumable electrode during a welding operation.

The connecting end 236 of the body tube 232 is telescopically engageable with the tubular end fitting 222 of the gun assembly 212. The connecting end 236 of the body tube 232 includes an annular recess 240 inwardly spaced from a terminus 242 of the connecting end. The connecting end 236 of the body tube 232 also includes a locking nut 244 and male threads 246 engageable with the female threads 224 of the tubular end fitting 222. The annular recess 240 may be a small diameter portion of the connecting end 236 of the neck assembly 214 disposed between the terminus 242 and the male threads 246, and having a smaller diameter (and hence smaller circumference) than the terminus and the male threads. The male threads 246 define a threaded portion of the locking nut 244 and are mateable with the complementary female threads 224 to releaseably join the tube body 232 to the tubular end fitting 222. The locking nut 244 and male threads 246 are disposed adjacent the annular recess 240 away from the terminus 242 on an opposite side of the annular recess relative to the terminus.

A stop such as a screw 258 is threadable into the aperture 256 in tubular end fitting 222 of the gun assembly 212, and the screw 258 extends into the annular recess 240. The screw 258 may be self-tapping, or the aperture 256 may include threads that are cooperable with the screw. As shown in FIGS. 9, 10 and 12, in an assembled disposition of the gun, i.e., when the two halves of the gun handle 216 are fastened together, the screw 258 is enclosed within the gun and not accessible, thereby preventing an unauthorized user from tampering with the screw 258. The body 260 of the screw 258 (similar to the protrusion 152 of the key 148 of the welding gun 110) protrudes into the annular recess 240 in the assembled disposition of the gun 210. The annular recess 240 includes a sidewall 254 opposite the locking nut 244 and male threads 246. The body 260 of the screw 258 is contactable with the sidewall 254 of the annular recess 240, thereby limiting axial movement of the neck assembly 214 as described in more detail below.

To install the neck assembly 214 on the gun assembly 212, the fasteners 228, 230 are unscrewed to allow the two halves of the handle 216 to be separated. The screw 258 is unscrewed and removed from the aperture 256, and the connecting end 236 of the body tube 232 is inserted into the tubular end fitting 222 of the gun assembly 212, as shown in FIGS. 7 and 8. The male threads 246 need to engage the female threads 224 in order for the aperture 256 to be lined up with the annular recess 240. The locking nut 244 is rotated clockwise to achieve this engagement. The screw 258 is then reinserted into the aperture 256 and turned until fully threaded into the aperture, the handle 216 halves are reconnected, and the fasteners 228, 230 are tightened to secure the handle together. In this assembled disposition, the body 260 of the screw 258 retains the neck assembly 214 in the gun assembly 212 by contacting the sidewall 254 of the annular recess 240 when the neck assembly is moved axially relative to the gun assembly, thereby limiting the outward axial movement of the neck assembly. This internal locking mechanism prevents the neck assembly 214 from being removed from the gun assembly 212 without disassembling the welding gun handle 216. Thus, the possibility of the neck assembly 214 being removed without proper authorization is greatly reduced.

While the screw 258 and annular recess 240 limit the axially movement of the neck assembly 214, the screw and annular recess allow for full 360 degree rotational movement of the neck assembly relative to the gun assembly 212, as shown in FIGS. 9, 10 and 12. Once the neck assembly 214 is fitted on the gun assembly 212 as described above, the neck assembly may be rotated radially 360 degrees about the tubular end fitting 222 of the gun assembly to position the welding end 234 of the body tube 232 in a desired orientation relative to the handle 216, depending on the requirements of the welding operation to be performed. When the welding end 234 is positioned in the desired orientation, the locking nut 244 is tightened, thereby engaging the male threads 246 with the female threads 224 and securing the neck assembly 214 in place. If the position of the neck assembly 214 later needs to be adjusted, the locking nut 244 is simply loosened, the neck assembly 214 is rotated relative to the gun assembly 212, and the locking nut is retightened.

If it is necessary to replace the neck assembly 214 with a different neck assembly (such as one having a body tube with a different angular bend), the handle 216 of the gun assembly 212 must be disassembled (with proper authorization) by unscrewing the fasteners 228, 230 to remove a handle 216 half to expose the screw 258. The screw 258 is unscrewed and removed from the aperture 256. The male threads 246 then need to be disengaged from the female threads 224 by rotating the locking nut 244 counterclockwise. The body tube 232 is pulled away from and out of the tubular end fitting 222 of the gun assembly 212, and a body tube of the replacement neck assembly is then inserted into the tubular end fitting. The male threads 246 then need to engage the female threads 224 in order for the aperture 256 to be lined up with the annular recess 240. The locking nut 244 is rotated clockwise to achieve this engagement. The screw 258 is reinserted and fully threaded into the aperture 256, and the handle 216 is reassembled to lock the neck assembly in the gun assembly.

With reference to FIGS. 13-18, an alternative welding gun 310 in accordance with the invention and similar to the welding gun 110 described above includes a gun assembly 312 and a neck assembly 314. The gun assembly 312 includes a handle 316 having a cable receiving end 318 for receiving a cable (not shown) such as a composite cable, unicable, or similar which supplies electrical current, shielding gas (such as helium or argon gas), and a consumable electrode (e.g., a metal welding wire) to the gun 310. The handle 316 also has an opposite connecting end 320 for receiving and connecting the neck assembly 314 to the gun assembly 312. The connecting end 320 includes a tubular end fitting 322 having female threads 324 proximal to the connecting end, and an aperture 362 adjacent the female threads 324. The aperture 362 is generally circular in shape.

As shown in FIG. 13, the handle 316 is formed of two separate halves that are secured together with fasteners 328, 330. One handle half may be released from the other handle half by loosening the fasteners 328, 330 to expose the inner components of the gun assembly 312, as described in more detail below. The handle 316 may be made of an electrically insulating material, such as a plastic, and may have a configuration adapted for facilitating manipulation of the welding gun 310 by a welder.

The neck assembly 314 includes a body tube 332 having a welding end 334 and also a connecting end 336. The body tube 332 may be of the type that includes an inner element made of a conductive metal such as copper, an outer element made of a metal such as brass, and an insulating element disposed between the inner and outer elements, and made of an appropriate material such as high temperature TEFLON, nylon, or the like. The insulating element prevents electrical current from flowing from the inner element to the outer element. The body tube 332 is bent at an angle for facilitating the welding process, and the angle may be, but is not limited to 22.5, 30, 45, or 60 degrees. Alternatively, the body tube 332 may be straight.

The welding end 334 of the body tube 332 terminates at a nozzle 338 covering a contact tip (not shown) which weldingly contacts the consumable electrode during a welding operation.

The connecting end 336 of the body tube 332 is telescopically engageable with the tubular end fitting 322 of the gun assembly 312. The connecting end 336 of the body tube 332 includes an annular recess 340 inwardly spaced from a terminus 342 of the connecting end. The connecting end 336 of the body tube 332 also includes a locking nut 344 and male threads 346 engageable with the female threads 324 of the tubular end fitting 322. The annular recess 340 may be a small diameter portion of the connecting end 336 of the neck assembly 314 disposed between the terminus 342 and the male threads 346, and having a smaller diameter (and hence smaller circumference) than the terminus and the male threads. The male threads 346 define a threaded portion of the locking nut 344 and are mateable with the complementary female threads 324 to releaseably join the tube body 332 to the tubular end fitting 322. The locking nut 344 and male threads 346 are disposed adjacent the annular recess 340 away from the terminus 342 on an opposite side of the annular recess relative to the terminus.

A stop such as a cylindrical pin 364 is insertable into the aperture 362 in tubular end fitting 322 of the gun assembly 312. While the pin 364 is shown as being cylindrical, the pin is not limited to a cylindrical shape. The pin 364 extends into the annular recess 340 in an assembled disposition of the gun, i.e., when the two halves of the gun handle 316 are fastened together. As shown in FIGS. 15, 16 and 18, the pin 364 is retained in the aperture 362 by an inner surface 350 of one of the handle 316 halves. The inner surface 350 is adjacent the female threads 324 of the tubular end fitting 322. An end 366 of the pin 364 is positioned in the annular recess 340 in the assembled disposition of the gun 310. The annular recess 340 includes a sidewall 354 opposite the locking nut 344 and male threads 346. The end 366 of the pin 364 is contactable with the sidewall 354 of the annular recess 340, thereby limiting axial movement of the neck assembly 314 as described in more detail below.

To install the neck assembly 314 on the gun assembly 312, the fasteners 328, 330 are unscrewed to allow the two halves of the handle 316 to be separated. The pin 364 is removed from the aperture 362, and the connecting end 336 of the body tube 332 is inserted into the tubular end fitting 322 of the gun assembly 312, as shown in FIGS. 13 and 14. The male threads 346 need to engage the female threads 324 in order for the aperture 362 to be lined up with the annular recess 340. The locking nut 344 is rotated clockwise to achieve this engagement. The pin 364 is then reinserted into the aperture 362, the handle 316 halves are reconnected, and the fasteners 328, 330 are tightened to secure the handle together. In this assembled disposition, the end 366 of the pin 364 retains the neck assembly 314 in the gun assembly 312 by contacting the sidewall 354 of the annular recess 340 when the neck assembly is moved axially relative to the gun assembly, thereby limiting the outward axial movement of the neck assembly. This internal locking mechanism prevents the neck assembly 314 from being removed from the gun assembly 312 without disassembling the welding gun handle 316. Thus, the possibility of the neck assembly 314 being removed without proper authorization is greatly reduced.

While the pin 364 and annular recess 340 limit the axially movement of the neck assembly 314, the pin and annular recess allow for full 360 degree rotational movement of the neck assembly relative to the gun assembly 312, as shown in FIGS. 15, 16 and 18. Once the neck assembly 314 is fitted on the gun assembly 312 as described above, the neck assembly may be rotated radially 360 degrees about the tubular end fitting 322 of the gun assembly to position the welding end 334 of the body tube 332 in a desired orientation relative to the handle 316, depending on the requirements of the welding operation to be performed. When the welding end 334 is positioned in the desired orientation, the locking nut 344 is tightened, thereby engaging the male threads 346 with the female threads 324 and securing the neck assembly 314 in place. If the position of the neck assembly 314 later needs to be adjusted, the locking nut 344 is simply loosened, the neck assembly 314 is rotated relative to the gun assembly 312, and the locking nut is retightened.

If it is necessary to replace the neck assembly 314 with a different neck assembly (such as one having a body tube with a different angular bend), the handle 316 of the gun assembly 312 must be disassembled (with proper authorization) by unscrewing the fasteners 328, 330 to release the pin 364 from the annular recess 340 and aperture 362. The male threads 346 need to be disengaged from the female threads 324 by rotating the locking nut 344 counterclockwise. The body tube 332 is pulled away from and out of the tubular end fitting 322 of the gun assembly 312, and a body tube of the replacement neck assembly is then inserted into the tubular end fitting. The male threads 346 need to engage the female threads 324 in order for the aperture 362 to be lined up with the annular recess 340. The locking nut 344 is rotated clockwise to achieve this engagement. The pin 364 is reinserted into the aperture 362, and the handle 316 is reassembled to lock the neck assembly in the gun assembly.

With reference to FIGS. 19-24, an alternative welding gun 410 in accordance with the invention and similar to the welding gun 110 described above includes a gun assembly 412 and a neck assembly 414. The gun assembly 412 includes a handle 416 having a cable receiving end 418 for receiving a cable (not shown) such as a composite cable, unicable, or similar which supplies electrical current, shielding gas (such as helium or argon gas), and a consumable electrode (e.g., a metal welding wire) to the gun 410. The handle 416 also has an opposite connecting end 420 for receiving and connecting the neck assembly 414 to the gun assembly 412. The connecting end 420 includes a tubular end fitting 422 having female threads 424 proximal to the connecting end, and an aperture 468 adjacent the female threads 424.

As shown in FIG. 19, the handle 416 is formed of two separate halves that are secured together with fasteners 428, 430. One handle half may be released from the other handle half by loosening the fasteners 428, 430 to expose the inner components of the gun assembly 412, as described in more detail below. The handle 416 may be made of an electrically insulating material, such as a plastic, and may have a configuration adapted for facilitating manipulation of the welding gun 410 by a welder.

The neck assembly 414 includes a body tube 432 having a welding end 434 and also a connecting end 436. The body tube 432 may be of the type that includes an inner element made of a conductive metal such as copper, an outer element made of a metal such as brass, and an insulating element disposed between the inner and outer elements, and made of an appropriate material such as high temperature TEFLON, nylon, or the like. The insulating element prevents electrical current from flowing from the inner element to the outer element. The body tube 432 is bent at an angle for facilitating the welding process, and the angle may be, but is not limited to 22.5, 30, 45, or 60 degrees. Alternatively, the body tube 432 may be straight.

The welding end 434 of the body tube 432 terminates at a nozzle 438 covering a contact tip (not shown) which weldingly contacts the consumable electrode during a welding operation.

The connecting end 436 of the body tube 432 is telescopically engageable with the tubular end fitting 422 of the gun assembly 412. The connecting end 436 of the body tube 432 includes an annular recess 440 inwardly spaced from a terminus 442 of the connecting end. The connecting end 436 of the body tube 432 also includes a locking nut 444 and male threads 446 engageable with the female threads 424 of the tubular end fitting 422. The annular recess 440 may be a small diameter portion of the connecting end 436 of the neck assembly 414 disposed between the terminus 442 and the male threads 446, and having a smaller diameter (and hence smaller circumference) than the terminus and the male threads. The male threads 446 define a threaded portion of the locking nut 444 and are mateable with the complementary female threads 424 to releaseably join the tube body 432 to the tubular end fitting 422. The locking nut 444 and male threads 446 are disposed adjacent the annular recess 440 away from the terminus 442 on an opposite side of the annular recess relative to the terminus.

Figure 22:
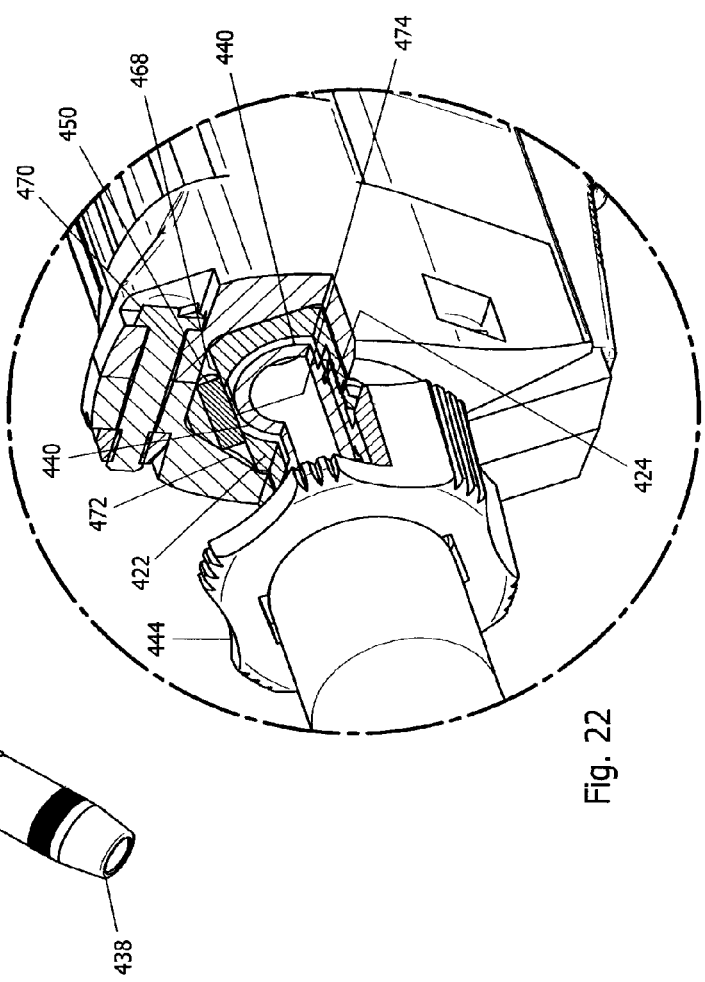
FIG. 22 is an enlarged view of a portion K in FIG. 21.

A stop such as a cylindrical pin 470 is insertable into the aperture 468 in tubular end fitting 422 of the gun assembly 412. While the pin 364 is shown as being cylindrical, the pin is not limited to a cylindrical shape. The aperture 468 is generally tangential to the annular recess 440, and when the pin 470 is disposed in the aperture, the pin generally is positioned sideways along the annular recess 440 (rather than perpendicular). The pin 470 extends into the annular recess 440 in an assembled disposition of the gun, i.e., when the two halves of the gun handle 416 are fastened together. As shown in FIGS. 21, 22 and 24, the pin 470 is retained in the aperture 468 by an inner surfaces 450, 472 of the handle 416 halves. The inner surfaces 450, 472 are adjacent the female threads 424 of the tubular end fitting 422. A portion of a side surface 474 of the pin 470 is positioned in the annular recess 440 in the assembled disposition of the gun 410. The annular recess 440 includes a sidewall 454 opposite the locking nut 444 and male threads 446. The side surface 474 of the pin 470 is contactable with the sidewall 454 of the annular recess 440, thereby limiting axial movement of the neck assembly 414 as described in more detail below.

To install the neck assembly 414 on the gun assembly 412, the fasteners 428, 430 are unscrewed to allow the two halves of the handle 416 to be separated. The pin 470 is removed from the aperture 468, and the connecting end 436 of the body tube 432 is inserted into the tubular end fitting 422 of the gun assembly 412, as shown in FIGS. 19 and 20. The male threads 446 need to engage the female threads 424 in order for the aperture 468 to be lined up with the annular recess 440. The locking nut 444 is rotated clockwise to achieve this engagement. The pin 470 is then reinserted into the aperture 468, the handle 416 halves are reconnected, and the fasteners 428, 430 are tightened to secure the handle together. In this assembled disposition, the side surface 474 of the pin 470 retains the neck assembly 414 in the gun assembly 412 by contacting the sidewall 454 of the annular recess 440 when the neck assembly is moved axially relative to the gun assembly, thereby limiting the outward axial movement of the neck assembly. This internal locking mechanism prevents the neck assembly 414 from being removed from the gun assembly 412 without disassembling the welding gun handle 416. Thus, the possibility of the neck assembly 414 being removed without proper authorization is greatly reduced.

While the pin 470 and annular recess 440 limit the axially movement of the neck assembly 414, the pin and annular recess allow for full 360 degree rotational movement of the neck assembly relative to the gun assembly 412, as shown in FIGS. 21, 22 and 24. Once the neck assembly 414 is fitted on the gun assembly 412 as described above, the neck assembly may be rotated radially 360 degrees about the tubular end fitting 422 of the gun assembly to position the welding end 434 of the body tube 432 in a desired orientation relative to the handle 416, depending on the requirements of the welding operation to be performed. When the welding end 434 is positioned in the desired orientation, the locking nut 444 is tightened, thereby engaging the male threads 446 with the female threads 424 and securing the neck assembly 414 in place. If the position of the neck assembly 414 later needs to be adjusted, the locking nut 444 is simply loosened, the neck assembly 414 is rotated relative to the gun assembly 412, and the locking nut is retightened.

If it is necessary to replace the neck assembly 414 with a different neck assembly (such as one having a body tube with a different angular bend), the handle 416 of the gun assembly 412 must be disassembled (with proper authorization) by unscrewing the fasteners 428, 430 to release the pin 470 from the annular recess 440 and aperture 468. The male threads 446 need to be disengaged from the female threads 424 by rotating the locking nut 444 counterclockwise. The body tube 432 is pulled away from and out of the tubular end fitting 422 of the gun assembly 412, and a body tube of the replacement neck assembly is then inserted into the tubular end fitting. The male threads 446 need to engage the female threads 424 in order for the aperture 468 to be lined up with the annular recess 440. The locking nut 444 is rotated clockwise to achieve this engagement. The pin 470 is reinserted into the aperture 468, and the handle 416 is reassembled to lock the neck assembly in the gun assembly.

Although the invention has been described by reference to a specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A welding gun comprising:
  a gun assembly including a handle having a cable receiving end and also a connecting end;
  said connecting end including a tubular end fitting having female threads proximal to said connecting end;
  said end fitting also having an aperture adjacent said female threads, said aperture having a quadrilateral shape;
  a neck assembly including a body tube having a welding end and also a connecting end;
  said connecting end of said body tube being telescopically engageable with said tubular end fitting;
  said connecting end of said body tube including a circumferential, annular ring-like recess perpendicular to a longitudinal direction of said body tube and inwardly spaced from a terminus of said connecting end;
  said connecting end of said body tube also including a locking nut and male threads engageable with said female threads;
  said locking nut and male threads being disposed adjacent said annular recess away from said terminus; and
  a stop defined by an arcuate key circumferentially fitable in said aperture and extending into said annular recess in an assembled disposition of the gun, thereby restricting axial movement of said neck assembly relative to said gun assembly yet allowing rotational movement of said neck assembly relative to said gun assembly, said arcuate key having a quadrilateral cross-sectional shape that coincides with the shape of said aperture, said arcuate key having an arcuate shape in a radial direction that is an arc portion of a circular quadrilateral shape, said arcuate key having an outer surface that is an arc portion of a convex polygonal shape, said arcuate key having a curved inner surface that coincides in shape with said circumferential annular recess, and said arcuate key further including a curved, radially extending protrusion along and parallel to an edge of said curved inner surface, said curved inner surface of said arcuate key being inserted face-first into said aperture and said curved protrusion being positioned in said circumferential annular recess in the assembled disposition of the gun.

2. The welding gun of claim 1, wherein said circumferential, annular ring-like recess is a small diameter portion of said connecting end of said neck assembly.

3. The welding gun of claim 1, wherein said circumferential, annular ring-like recess is smaller in diameter than said male threads and said terminus of said connecting end of said neck assembly.

4. The welding gun of claim 1, wherein said arcuate key is retained by an inner surface of said handle adjacent said female threads of said tubular end fitting.

5. The welding gun of claim 1, wherein said circumferential, annular ring-like recess includes a sidewall opposite said locking nut and male threads, and said protrusion of said arcuate key is contactable with said sidewall of said circumferential, annular ring-like recess, thereby limiting axial movement of said neck assembly.

* * * * *